United States Patent Office 3,118,936
Patented Jan. 21, 1964

3,118,936
REACTION PRODUCTS OF PENTABORANE(9) AND CERTAIN HALOMETHANES
Elmar R. Altwicker, Middlesex, N.J., Samuel W. Harris, Whiting, Ind., and Earl A. Weilmuenster, Kenmore, N.Y., assignors to Olin Mathieson Chemical Corporation, a corporation of Virginia
No Drawing. Filed Dec. 17, 1957, Ser. No. 703,463
10 Claims. (Cl. 260—543)

This invention relates to organo boron compounds which are useful as fuels. The organoboron compounds are prepared by the reaction of pentaborane(9) and a halomethane using an alkylation catalyst. The reaction between the pentaborane(9) and halomethane results in the production of the normally liquid compound pentaborylmethyldichloroborane of the formula $B_5H_8CH_2BCl_2$ and it also results in the production of 1,1'-dipentaborylmethane which has the formula $(B_5H_8)_2CH_2$ and which is a solid.

Pentaborane(9) can be prepared by methods described in the art; it is colorless liquid which melts at $-46.8°$ C. The boron hydrides and pentaborane(9) in particular, because of their high heats of combustion, have been recognized as materials which are potentially of value as a high energy fuel. The burning of these materials with oxygen creates considerably more energy than the burning of a corresponding amount of hydrocarbon, producing very high flame temperatures. Pentborane(9) suffers, however, from several disadvantages; (1) it has a very disagreeable odor; (2) it has a relatively high vapor pressure, its vapor pressure being 66 mm. of mercury at $0°$ C. and its boiling point at atmospheric pressure being $58°$ C., and (3) its vapors are highly toxic. The pentaborylmethyldichloroborane produced in accordance with this invention is a borohydrocarbon of relatively high boron content and at the same time it is a liquid having a somewhat lower vapor pressure than pentaborane(9) itself so that it constitutes a conveniently handled fuel for use in gas turbines, such as jet engines.

The solid fuel of this invention, 1,1'-dipentaborylmethane, when incorporated with a suitable oxidizer such as ammonium perchlorate, potassium perchlorate, sodium perchlorate, lithium perchlorate, aluminum perchlorate, ammonium nitrate, etc. yields solid propellants suitable for rocket power plants and other jet propelled devices. Such propellants burn with high flame speeds, having high heats of combustion and are of the high specific impulse type. The solid fuel of this invention when incorporated with oxidizers is capable of being formed into a wide variety of grains, tablets and shapes, all with desirable chemical and mechanical properties. Propellants produced by the methods described in this disclosure burn uniformly without disintegration when ignited by conventional means, such as a pyrotechnic type igniter, and are mechanically strong enough to withstand ordinary handling.

According to this invention, pentaborylmethyldichloroborane and 1,1'-dipentaborylmethane are produced by reacting pentaborane(9) and a halomethane in the presence of an alkylation catalyst, such as aluminum chloride, aluminum bromide, ferric chloride, or mixtures thereof. The halomethane used is of the type $X_1X_2X_3X_4C$ wherein $X_1$ and $X_2$ are chlorine or bromine and $X_3$ and $X_4$ are chlorine, bromine or hydrogen. The temperature at which the reaction between the pentaborane(9) and the halomethane can be carried out can be varied widely, generally being from about $10°$ C. to about $120°$ C., and preferably from about $25°$ C. to about $95°$ C. Also, the quantities of halomethane introduced into the reaction zone can be varied over a wide range, generally being from about 0.15 to about 2.0 moles per mole of pentaborane(9), and preferably from about 0.20 to about 1.25 moles per mole of pentaborane(9). The amount of catalyst used will generally be within the range from about 0.005 to about 0.150 mole per mole of pentaborane(9), the preferred range being from about 0.02 to about 0.10 mole per mole of pentaborane(9). The reaction time usually varies from one to thirty hours or more.

The following examples illustrate the invention. In the examples the term "moles" signifies gram moles.

EXAMPLE I

The reactor used in this experiment was a spherical glass bulb of 0.56 liter capacity equipped with an outlet tube with standard tapered joints for attachment to a vacuum line and also provided with a sealed break off tube. After the reactor had been evacuated and tested for leaks it was filled with dry nitrogen and stoppered. Aluminum chloride in the amount of 3.7 millimoles was then added. The aluminum chloride used had been resublimed under high vacuum and had been stored under nitrogen. After the addition of the aluminum chloride, charging. The reactor was cooled to $-196°$ C. by immersion in a bath containing liquid nitrogen, and pentaborane(9) in the amount of 79.4 millimoles, methylene chloride in the amount of 39.7 millimoles and about 10 milliliters of normal heptane were condensed by vacuum transfer in the order mentioned into the reactor. In the next step, the reactor was sealed and placed inside a wire screen. The reactor was heated to a temperature of 85 to $92°$ C. for 3.15 hours and at the end of that time the solution, which at the beginning of the reaction was homogeneous except for some undissolved aluminum chloride, contained a large amount of yellow viscous tars which separated from the normal heptane. The solution was also yellow colored. Then the reactor was cooled to $-196°$ C. by immersion in a bath of liquid nitrogen, attached to the vacuum line and opened by means of a tube opener and a total of 42 millimoles of non-condensable gas was pumped off from the reactor flask through a trap maintained at $-196°$ C. The contents of the reactor were then warmed to room temperature and passed through a series of cold traps maintained at $-36°$ C., $-78°$ C. and $-196°$ C. respectively.

The material in the $-196°$ C. trap was passed repeatedly through a series of traps held at $-78°$ C., $-97°$ C., $-142°$ C. and $-196°$ C. respectively. The material passing through the $-142°$ C. trap was a mixture of diborane and hydrogen chloride, the material in the $-97°$ C. trap was principally recovered methylene chloride and the material in the $-78°$ C. trap was principally recovered pentaborane(9).

The material in the original $-78°$ C. trap was subjected to a similar series of fractional condensations, being passed through a series of traps maintained at $-36°$ C., $-78°$ C., $-97°$ C. and $-196°$ C., respectively. The $-36°$ C. trap contained mostly n-heptane, the $-78°$ C. trap contained mostly pentaborane(9) while the material in the other traps was added to the original $-196°$ C. fraction and further fractionated.

The material in the trap held at $-36°$ C. was warmed to room temperature and passed several times through two traps maintained at $-36°$ C. and $-196°$ C. respectively to remove n-heptane.

The material remaining in the $-36°$ C. was a liquid-crystal mixture. On warming up, the liquid flowed to the bottom of the trap while the crystals clung to the walls. The bottom of the trap was then held at $0°$ C. to $-20°$ C. and connected to a storage tube held at $-196°$ C. Some of the crystals transferred to this storage tube, although some of them migrated to the bottom of the trap. This procedure yielded fairly pure crystals in the storage tube but had to be repeated to obtain analytically pure samples. The fractions recovered by the fractional vacuum crystallization procedure were weighed or condensed in water and titrated. The following materials were recovered from the various traps:

| | Mmoles |
|---|---|
| Hydrogen chloride formed | 5.4 |
| Diborane formed | 0.11 |
| Pentaborane | 47.4 |
| Methylene dichloride | 5.1 |

The crystalline salt melted at 50–52° C. and was identified as 1,1'-dipentaborylmethane by elemental analysis, molecular weight, mass spectroscopy, and by infrared analysis. Some of the analytical results are shown in Table I below:

*Table I*

| | Percent B | Percent C | Percent hydrolyzable hydrogen |
|---|---|---|---|
| Theory for $B_5H_8CH_2B_5H_8$ | 78.2 | 8.7 | 11.56 |
| Actual | 77.5 | 8.5 | 11.2 |

The molecular weight was determined by the freezing point depression method (using cyclohexane as solvent) and found to be 139.0; the theoretical value is 138.2. The yield of 1,1'-dipentaborylmethane was 0.5 millimole (3.1 percent) which corresponds to a conversion of 1.2 percent pentaborane(9) charge.

The liquid in the bottom of the —36° C. trap, which had a vapor pressure of about one millimeter of mercury at room temperature, was purified by removing as much of the crystalline material as possible by further evaporation and condensation as described previously. This liquid was shown to be pentaborylmethyldichloroborane, $B_5H_8CH_2BCl_2$, by elemental analysis, molecular weight, infrared and mass spectroscopy analysis. The yield was about 1 millimole based on the total amount of pentaborane(9) charged. Some of the analytical results are shown in Table II below:

*Table II*

| | Percent B | Percent C | Percent Cl | Percent hydrolyzable hydrogen |
|---|---|---|---|---|
| Theoretical for $B_5H_8CH_2BCl_2$ | 41.1 | 7.6 | 45.1 | 5.1 |
| Actual | 43.3 | 7.5 | 37.0 | 4.8 |

The molecular weight was determined by freezing point depression to be 166.5 as compared to a theoretical value of 158.0.

Examples II and III were performed in a manner similar to that illustrated in Example I. The results obtained in these experiments as well as in Example I and other examples are summarized in Table III.

EXAMPLE IV

A 125 milliliter Erlenmeyer flask equipped with a standard-tapered ball joint was utilized as a reactor in this example. The flask was evacuated and filled with dry nitrogen and into it were placed 4.5 millimoles of aluminum chloride and a magnetic stirring bar. The flask was attached to a vacuum manifold, evacuated, and charged with 60.5 millimoles of pentaborane(9) and 71.7 millimoles of methylene chloride after the flask had been cooled to —196° C. The mixture was warmed to room temperature and stirred for 12 hours. It was then cooled to —196° C. by immersion in a trap containing liquid nitrogen and the non-condensable gas was pumped off through a trap maintained at —196° C. The mixture was fractionated as described in Example I and 0.5 millimoles of 1,1'-dipentaborylmethane was obtained which was identified by the usual infrared and mass spectrographic as well as by elemental analysis. This represents a conversion of 1.6 percent based on the pentaborane(9) used in the reaction. This experiment is summarized in Table III.

EXAMPLE V

After a 560 cc. glass reactor had been evacuated using a vacuum line and tested for leaks, it was filled with dry nitrogen, stoppered and weighed. To the reactor there was added 2.2 millimoles of resublimed aluminum chloride. The reactor was weighed, attached to the vacuum line and evacuated again. Next, 50.9 millimoles of pentaborane(9) and 36.3 millimoles of methylene chloride were condensed by vacuum transfer into the reactor. The reactor was sealed off, removed from the vacuum line and placed inside a wire screen.

In the next step, the reactor was heated to 68–72° C. for 7 hours, after which it was allowed to cool to room temperature and then further cooled to —196° C. by immersion in a bath containing liquid nitrogen. The reactor was attached to the vacuum line, opened to the line with a tube opener and the non-condensable gas (principally hydrogen) pumped off through a trap maintained at —196° C. A total of 11.9 millimoles of hydrogen was removed.

A similar reaction was carried out in which 4.3 millimoles of aluminum chloride, 64.4 millimoles of pentaborane(9) and 26.5 millimoles of methylene chloride were reacted for 5 hours at a temperature of 68 to 72° C. in the same manner as described in the first part of this experiment in the two paragraphs above. At the conclusion of the reaction, the reactor was allowed to cool to room temperature and then further cooled to —196° C. by immersion in a bath containing liquid nitrogen as before. The reactor was attached to the vacuum line, opened to the line with a tube opener and the non-condensable gas (hydrogen) in the amount of 13.6 millimoles was pumped off through a trap maintained at —196° C.

In the next step, the reaction mixture from the first reaction of this example was allowed to warm up and fractionated through two traps maintained at —36° C. and —196° C. respectviely. In a like manner, the material remaining after removal of the non-condensable gas in the second part of the experiment was allowed to warm up and fractionated into the same two traps maintained

*Table III*

REACTION OF PENTABORANE(9) WITH METHYLENE CHLORIDE

| Example | Reactants, mmoles | | | | Reactor size, liters | Time, hrs. | Temp., °C. | $B_5H_8CH_2B_5H_8$, mmoles | $B_5H_8CH_2BCl_2$, mmoles |
|---|---|---|---|---|---|---|---|---|---|
| | $B_5H_9$ | Halide | Catalyst | Solvent, ml. | | | | | |
| I | 79.4 | 39.7 | 3.7, $AlCl_3$ | n-Heptane, 10 | 0.56 | 3.15 | 85–92 | 0.5 | ~1. |
| II | 113.3 | 54.8 | 1.8, $AlBr_3$ | n-Heptane, 15 | 1.06 | 2.5 | 80–85 | 0.8 | ND. |
| III | 69.9 | 26.6 | 3.7, $AlCl_3$ | n-Heptane, 15 | 0.56 | 6 | 78 | 3.6 | ND. |
| IV | 60.5 | 71.7 | 4.5, $AlCl_3$ | None | 0.125 | 12 | 25 | 0.5 | 0.5. |
| V | { 50.9 | 36.3 | 2.2, $AlCl_3$ | do | 0.56 | 7 | 68–72 } | 2.2 | 0.7. |
|   | { 64.4 | 26.5 | 4.3, $AlCl_3$ | do | 0.56 | 5 | 68–72 }  |     |     |
| VI | 60.0 | 56.1 | 3.5, $AlCl_3$ | do | 0.56 | 24 | Rt–70 | 1.4 | ND. |

ND=Amount not determined. Rt=Room temperature.

at −36° C. and −196° C. The combined material in the −196° C. trap was fractionated repeatedly through a series of traps maintained at −36° C., −45° C., −52° C., −78° C., −97° C., −142° C. and −196° C. The small amount of liquid crystalline material in the original −36° C. trap was transferred to a small distillation flask.

In an inert atmosphere small portions of dry methylene chloride were added to the reactor to dissolve the tars remaining after removal of the liquid portion. The reactor was inverted after each addition of solvent and the contents added to the distillation flask. This action was carried out several times with small portions of methylene chloride and the washings in each case were added to the distillation flask. The flask was then capped and attached to a series of three small U-traps constructed of 8 millimeter tubing, the last of which was attached to the high vacuum line. The solvent was removed by pumping slowly while warming the flask to about −20° C. Then the three U-traps were placed in cold baths maintained at −20° C., −45° C. and −78° C. respectively and the flask was allowed to warm to room temperature with the −78° C. trap connected to the vacuum line. The distillation operation was continued for about 6 hours. Some solvent collected in the −78° C. trap, a small amount of liquid in the −45° C. trap and some liquid in the bottom of the −20° C. trap as well as crystals on the wall above the coolant level in the −20° C. trap. The liquid in the bottom of the −20° C. trap was analyzed by infrared, mass spectroscopic methods, and elemental analyses and shown to be pentaborylmethyldichloroborane (yield: 0.09 gram) while the crystals were shown by the same analytical methods to be 1,1′-dipentaborylmethane (yield: 0.06 gram).

In the next step, the distillation flask was connected to three U-traps in series held at −20° C., −45° C., and −78° C. as before and the flask was heated slowly to 80° C. by means of an oil bath. No material was collected in the −78° C. trap but in the −45° C. trap there was collected 0.025 gram of 1-pentaborylborondichloromethane as identified by infrared, mass spectographic methods and elemental analysis. In the −20° C. trap there was obtained 0.17 gram of 1,1′-dipentaborylmethane which was slightly contaminated and had a melting point of 47–51° C. After purification by sublimation the melting point of the crystals was 50.8–51.8° C. The purified product was identified by the methods used in Example I.

EXAMPLE VI

In this example 60.0 millimoles of pentaborane(9) and 56.1 millimoles of methylene chloride were reacted in the presence of 3.5 millimoles of aluminum chloride in a manner similar to that of Example V. The results of this experiment are summarized in Table III.

EXAMPLE VII

Two reactions were carried out in the manner of Example V using bromochloromethane ($CH_2BrCl$) as the alkylating material and the products of these two reactions were combined and treated in the manner described in the previous example. Due to the closeness in vapor pressures of bromochloromethane and pentaborane(9) the unreacted materials could not be separated by the procedure of fractional condensation and evaporation. They were recovered together from a fractionation through three traps maintained at −20° C., −36° C. and −196° C. respectively. The −196° C. fraction was then refractionated through four traps maintained at −36° C., −52° C., −78° C. and −196° C. The trap held at −52° C. yielded mainly pentaborane(9) and bromochloromethane. The products of the reaction were separated by fractional vacuum techniques as described in the previous examples. A total of 2.2 millimoles of solid product was recovered which was shown by mass spectrographic and infrared analysis to be 1,1′-dipentaborylmethane. The experimental conditions and results obtained in this example are summarized in Table IV.

EXAMPLE VIII

In this example dibromomethane was reacted with pentaborane(9) in the presence of aluminum chloride. The reactor used was a 150 cc. Erlenmeyer flask equipped with a water-cooled condenser. The details of this experiment are similar to those given in Example IV. A thermometer was suspended in the reflux condenser section of the reactor flask. The highest reflux temperature measured was 50° C. when the flask was heated at a temperature of 83° C. A total of 91.2 millimoles of pentaborane(9), 17.7 millimoles of dibromomethane and 3.0 millimoles of aluminum chloride constituted the reaction mixture which was heated at 50° C. for 5½ hours. The products were fractionated in the same manner as described in Example I, and a total of 0.2 millimole of 1,1′-dipentaborylmethane was obtained. Identification was by means of mass spectrographic and infrared analysis. The results of this experiment are shown in Table IV.

*Table IV*

REACTION OF PENTABORANE(9) WITH BROMOCHLOROMETHANE OR DIBROMOMETHANE

| Example | Reactants, mmoles | | | | Size reaction, liters | Time, hrs. | Temp., °C. | $B_5H_8CH_2B_5H_8$, mmoles | $B_5H_8CH_2BCl_2$, mmoles |
|---|---|---|---|---|---|---|---|---|---|
| | $B_5H_9$ | Halide | Catalyst | Solvent, ml. | | | | | |
| VII | { 81.8 | ($CH_2BrCl$) 25.6 | 3.9 $AlCl_3$ | | .56 | 10 | 75 | 2.2 | ND. |
|     | { 93.0 | ($CH_2BrCl$) 27.8 | 4.5 $AlCl_3$ | | .56 | 6 | 75 | | |
| VIII | 91.2 | ($CH_2Br_2$) 17.7 | 3.0 $AlCl_3$ | | ~.15 | 5.5 | 50 | .2 | ND. |

ND=Amount not determined.

EXAMPLES IX–XV

A number of reactions were carried out between pentaborane(9) and chloroform in the presence of anhydrous aluminum chloride. Essentially these reactions were carried out in the same manner as described in previous examples. The quantities of reactants used and the results obtained are given in Table V. Because of the closeness of the vapor pressure of chloroform and pentaborane(9) these materials could not be separated by fractionation and were recovered together as in previous instances.

The chief product was 1-pentaborylmethyldichloroborane, $B_5H_8CH_2BCl_2$, which was formed in four to ten percent conversion, based on the pentaborane(9) charged. This product was identical to the one obtained from the reactions with methylene halides and was identified by elemental, infrared and mass spectroscopic analyses. This material was obtained from a U-trap distillation as described in Example V. 1,1′-dipentaborylmethane was also formed. Additional examples with chloroform are shown in Table V.

Table V
REACTION OF PENTABORANE(9) WITH CHLOROFORM

| Example | Reactants, mmoles | | | Size reactor, liters | Time, hrs. | Temp., °C. | Products, $B_5H_8CH_2BCl_2$, g. |
|---|---|---|---|---|---|---|---|
| | $B_5H_9$ | $CHCl_3$ | $AlCl_3$ | | | | |
| IX | 89.6 | 26.6 | 3.7 | 0.56 | 4 | 68 | 0.5924 |
| | | | | | 1 5 | Rt | |
| X | 73.8 | 24.7 | 3.4 | 0.56 | 4.5 | 70–73 | 0.6620 |
| XI | 94.7 | 25.4 | 7.7 | 0.56 | 4.33 | 70 | 1.28 |
| XII | 77.4 | 27.0 | 2.3 | 0.56 | 3.75 | 70.73 | 0.9990 |
| XIII | 83.4 | 26.1 | 3.9 | 0.56 | 3.75 | 70–73 | |
| XIV | 82.0 | 22.9 | 6.1 | 0.56 | 4.0 | 72 | ~0.6 |
| XV | 79.4 | 25.8 | 4.2 | 0.56 | 4.5 | 70–72 | 1.319 |

1 Days.
Rt = Room temperature.

EXAMPLE XVI

In this example, 58.1 millimoles of pentaborane(9) and 18.5 millimoles of carbon tetrachloride were reacted in the presence of 2.4 millimoles of aluminum chloride in a 560 ml. reactor for a period of 2 hours at a temperature of 65–67° C. and in a manner similar to that of the previous examples. The products were separated as described previously. From the U-trap distillation procedure described in Example V, a total of 0.2 gram of pentaborylmethyldichloroborane was obtained. During the reaction 38.0 millimoles of pentaborane(9) was consumed and the products of the reaction were hydrogen, 26.4 millimoles; hydrogen chloride, 1.8 millimoles; diborane, 10.9 millimoles and boron trichloride, 9.5 millimoles in addition to the pentaborylmethyldichloroborane.

The results of an elemental analysis are shown in Table VI below:

Table VI

| | Percent B | Percent C | Percent H |
|---|---|---|---|
| Theoretical for $B_5H_8CH_2BCl_2$ | 41.1 | 7.6 | 5.1 |
| Actual | 40.1 | 7.7 | 4.5 |

1,1'-dipentaborylmethane was also formed.

The boron-containing solid material (1,1'-dipentaborylmethane) produced by practicing the method of this invention can be employed as an ingredient of solid propellant compositions in accordance with general procedures which are well-understood in the art, inasmuch as it is readily oxidized using conventional solid oxidizers, such as ammonium perchlorate, potassium perchlorate, sodium perchlorate, lithium perchlorate, aluminum perchlorate, ammonium nitrate and the like. In formulating a solid propellant composition employing the solid material produced in accordance with the present invention, generally from 10 to 35 parts by weight of the solid material and from 65 to 90 parts by weight of oxidizer, such as ammonium perchlorate, are present in the final propellant composition. In the propellant, the oxidizer and the solid material of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable organoboron solid material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

Pentaborylmethyldichloroborane can be employed as a fuel when burned with air. Thus it can be used as a fuel in basic and combustion systems in gas turbines particularly aircraft gas turbines of the turbojet or turboprop type. Each of those types is a device in which air is compressed and fuel is then burned in a combustor in admixture with the air. Following this, the products of combustion are expanded through a gas turbine. Pentaborylmethyldichloroborane can be used as a fuel in the combustors of aircraft gas turbines of the type just described.

Thus, when used as the fuel supplied to the combustor of an aircraft gas turbine engine, pentaborylmethyldichloroborane is employed in essentially the same manner as the hydrocarbon fuels presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine.

What is claimed is:

1. A method for the production of organoboron compounds used as fuels which comprises reacting pentaborane(9) and a compound of the class $X_1X_2X_3X_4C$ at a temperature within the range from about 10° C. to about 120° C. while the reactants are in admixture with a catalytic amount of a material selected from the group consisting of aluminum chloride and aluminum bromide, $X_1$ and $X_2$ being selected from the group consisting of chlorine and bromine and $X_3$ and $X_4$ being selected from the group consisting of chlorine, bromine and hydrogen.

2. The method of claim 1 wherein $X_1X_2X_3X_4C$ is methylene chloride.

3. The method of claim 1 wherein $X_1X_2X_3X_4C$ is chloroform.

4. The method of claim 1 wherein $X_1X_2X_3X_4C$ is carbon tetrachloride.

5. The method of claim 1 wherein $X_1X_2X_3X_4C$ is $CH_2BrCl$.

6. The method of claim 1 wherein $X_1X_2X_3X_4C$ is methylene bromide.

7. The method of claim 1 wherein the reaction is conducted at a temperature within the range from about 25° C. to about 95° C., wherein from about 0.15 to about 2.0 moles of $X_1X_2X_3X_4C$ is introduced into the reaction zone per mole of pentaborane(9) and wherein the amount of said material selected from the group consisting of aluminum chloride and aluminum bromide is from about 0.005 to about 0.150 mole per mole of pentaborane(9).

8. 1,1'-dipentaborylmethane of the formula $(B_5H_8)_2CH_2$.

9. Pentaborylmethyldichloroborane of the formula $B_5H_8CH_2BCl_2$.

10. An organoboron compound useful as a fuel selected from the class consisting of 1,1'-dipentaborylmethane of the formula $(B_5H_8)_2CH_2$ and pentaborylmethyldichloroborane of the formula $B_5H_8CH_2BCl_2$.

References Cited in the file of this patent

UNITED STATES PATENTS

| | | |
|---|---|---|
| 2,987,554 | Levy et al. | June 6, 1961 |
| 3,030,422 | Clark et al. | Apr. 17, 1962 |
| 3,038,012 | Altwicker et al. | June 5, 1962 |
| 3,052,725 | Altwicker et al. | Sept. 4, 1962 |

UNITED STATES PATENT OFFICE
CERTIFICATE OF CORRECTION

Patent No. 3,118,936                                              January 21, 1964

Elmar R. Altwicker et al.

It is hereby certified that error appears in the above numbered patent requiring correction and that the said Letters Patent should read as corrected below.

Column 1, line 29, for "Pentborane(9)" read -- Pentaborane(9) --; column 2, line 22, after "chloride," insert -- the reactor was evacuated again and was then ready for --; line 65, after "-36° C." insert -- trap --; column 5, lines 56 and 57, for "1-pentaborylborondichloromethane" read -- pentaborylmethyldichloroborane --; column 6, lines 66 and 67, before "pentaborylmethyldichloroborane" strike out "1 "; column 7, Table V, under the heading "Temp.,° C." for "70.73" read -- 70-73 --.

Signed and sealed this 16th day of June 1964.

(SEAL)
Attest:

ERNEST W. SWIDER                                         EDWARD J. BRENNER
Attesting Officer                                              Commissioner of Patents